United States Patent
Chang et al.

(10) Patent No.: US 10,686,281 B2
(45) Date of Patent: *Jun. 16, 2020

(54) POWER CORD RETENTION DEVICE

(71) Applicant: Quanta Computer Inc., Taoyuan (TW)

(72) Inventors: Hou-Hsien Chang, Taoyuan (TW);
Yen-Chung Hou, Taoyuan (TW);
Wei-Chih Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,667

(22) Filed: Jan. 27, 2020

(65) Prior Publication Data
US 2020/0161808 A1 May 21, 2020

Related U.S. Application Data

(63) Continuation of application No. 16/030,275, filed on Jul. 9, 2018, now Pat. No. 10,608,378.
(Continued)

(51) Int. Cl.
*H01R 13/627* (2006.01)
*H01R 13/639* (2006.01)
(Continued)

(52) U.S. Cl.
CPC ............ *H01R 13/639* (2013.01); *F16L 3/137* (2013.01); *H02G 3/32* (2013.01); *F16B 2/08* (2013.01);
(Continued)

(58) Field of Classification Search
CPC .............. H01R 13/639; H01R 13/6392; H01R 13/6395; H01R 24/70; H01R 24/76; F16L 3/137; H02G 3/32
(Continued)

(56) References Cited

U.S. PATENT DOCUMENTS

| 8,456,845 B2* | 6/2013 | Liu | ........................ G06F 1/188 |
| | | | 361/695 |
| 8,847,085 B2* | 9/2014 | Chen | ........................ H02J 1/00 |
| | | | 174/50 |

(Continued)

FOREIGN PATENT DOCUMENTS

| JP | S60-45481 U | 3/1985 |
| JP | 2009-74636 A | 4/2009 |

OTHER PUBLICATIONS

JP Office Action for Application No. 2018-229802, dated Jan. 28, 2020, w/ First Office Action Summary.
(Continued)

*Primary Examiner* — Khiem M Nguyen
(74) *Attorney, Agent, or Firm* — Nixon Peabody LLP

(57) ABSTRACT

A retention apparatus is provided for securing a cable into a receptacle of an electronic device. The retention apparatus includes a body with two distal ends. A buckle is located at one distal end while a housing is located at the opposite distal end. The buckle includes at least one tooth. The housing includes a receiver configured to secure the buckle and a handle portion. The receiver includes a securing element and guide. The securing element includes at least one notch to interconnect with the at least one tooth of the buckle.

14 Claims, 6 Drawing Sheets

Related U.S. Application Data

(60) Provisional application No. 62/607,165, filed on Dec. 18, 2017.

(51) Int. Cl.
*H02G 3/32* (2006.01)
*F16L 3/137* (2006.01)
*H01R 103/00* (2006.01)
*F16B 2/08* (2006.01)
*H01R 24/76* (2011.01)
*H01R 24/70* (2011.01)

(52) U.S. Cl.
CPC .......... *H01R 13/6395* (2013.01); *H01R 24/70* (2013.01); *H01R 24/76* (2013.01); *H01R 2103/00* (2013.01)

(58) Field of Classification Search
USPC ........................................ 439/349, 449, 459
See application file for complete search history.

(56) References Cited

U.S. PATENT DOCUMENTS

| | | | | |
|---|---|---|---|---|
| 9,210,828 B2 * | 12/2015 | Liao | ........................ | H05K 5/023 |
| 10,608,378 B2 | 3/2020 | Chang et al. | | |
| 2012/0097804 A1 * | 4/2012 | Liu | ........................ | H02G 3/26 |
| | | | | 248/68.1 |
| 2017/0077648 A1 * | 3/2017 | Yi | ........................ | H01R 13/6392 |

OTHER PUBLICATIONS

Extended European Search Report for EP Application No. 18212438.8, dated Mar. 22, 2019, w/EESR Summary.

* cited by examiner

POWER CORD RETENTION DEVICE

CROSS REFERENCE TO RELATED APPLICATIONS

This application is a continuation of U.S. Non-provisional application Ser. No. 16/030,275, filed Jul. 9, 2018; which in turn claims priority under 35 U.S.C. § 119 to U.S. Provisional Application Ser. No. 62/607,165, entitled "DESIGN FOR POWER CORD RETENTION", filed on Dec. 18, 2017. The contents of those applications are incorporated by reference in their entirety.

FIELD OF THE INVENTION

This application generally relates to computing cables and power cables. Specifically, this application relates to an apparatus for retaining a plug in a receptacle.

BACKGROUND

The need for an electrical power cord that supplies power to remain connected to the electronics housing is critical to the proper operation of an electronics system. Inadvertent disconnection from the electronics housing can cause system failure. For storage systems, the loss of power can result in data loss and downtime. Previous efforts to devise a power cord retention mechanism have used a clip or a flange attached to the electronic device with features designed to grasp and hold a specific style of power cord plugged into the device. However, the conventional power cord retention mechanisms have large widths that interfere with the hot-swappable module when plugging and unplugging the power cord into the system.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

A retention apparatus is provided for securing a cable into a receptacle of an electronic device. The retention apparatus includes a body with two distal ends. A buckle is located at one distal end while a housing is located at the opposite distal end. The buckle includes at least one tooth. The housing includes a receiver configured to secure the buckle and a handle portion. The receiver includes a securing element and guide. The securing element includes at least one notch to interconnect with the at least one tooth of the buckle.

In some implementations, the buckle includes a stop feature configured to restrain the buckle from becoming completely inserted into the receiver such that a resulting bending does not cause damage to the buckle. In some implementations, the securing element includes a notch configured to receive the tooth as the buckle is being inserted into the receiver. In some implementations, the receiver includes a guide with a smooth surface that guides the free end of the buckle into the receiver. In some implementations, the connection of the handle portion to the receiver is configured to position the securing element away from the guide to release the tooth of the buckle from the receiver. In some implementations, the retention apparatus also includes a connector configured to connect the retention apparatus to an electronic component.

A system is provided for securing a cable into a receptacle of an electronic device. The system includes an electronic device that has a receptacle. The system also includes a cord configured to connect to the electronic device via the receptacle. The system also includes a retention apparatus for securing the cable. The retention apparatus includes a body that has a first distal end and a second distal end. The retention apparatus includes a buckle connected to the retention apparatus at the first distal end of the body. A free end of the buckle includes at least one tooth. The retention apparatus also includes a housing located at either the first end or the second distal end of the body. The housing includes a receiver configured to secure the free end of the buckle via the at least one tooth. The housing also includes a handle portion connected to the receiver and configured to release the free end of the buckle.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope The principles are described and explained with additional specificity and detail through the use of the following drawings.

DETAILED DESCRIPTION

Figure 1:
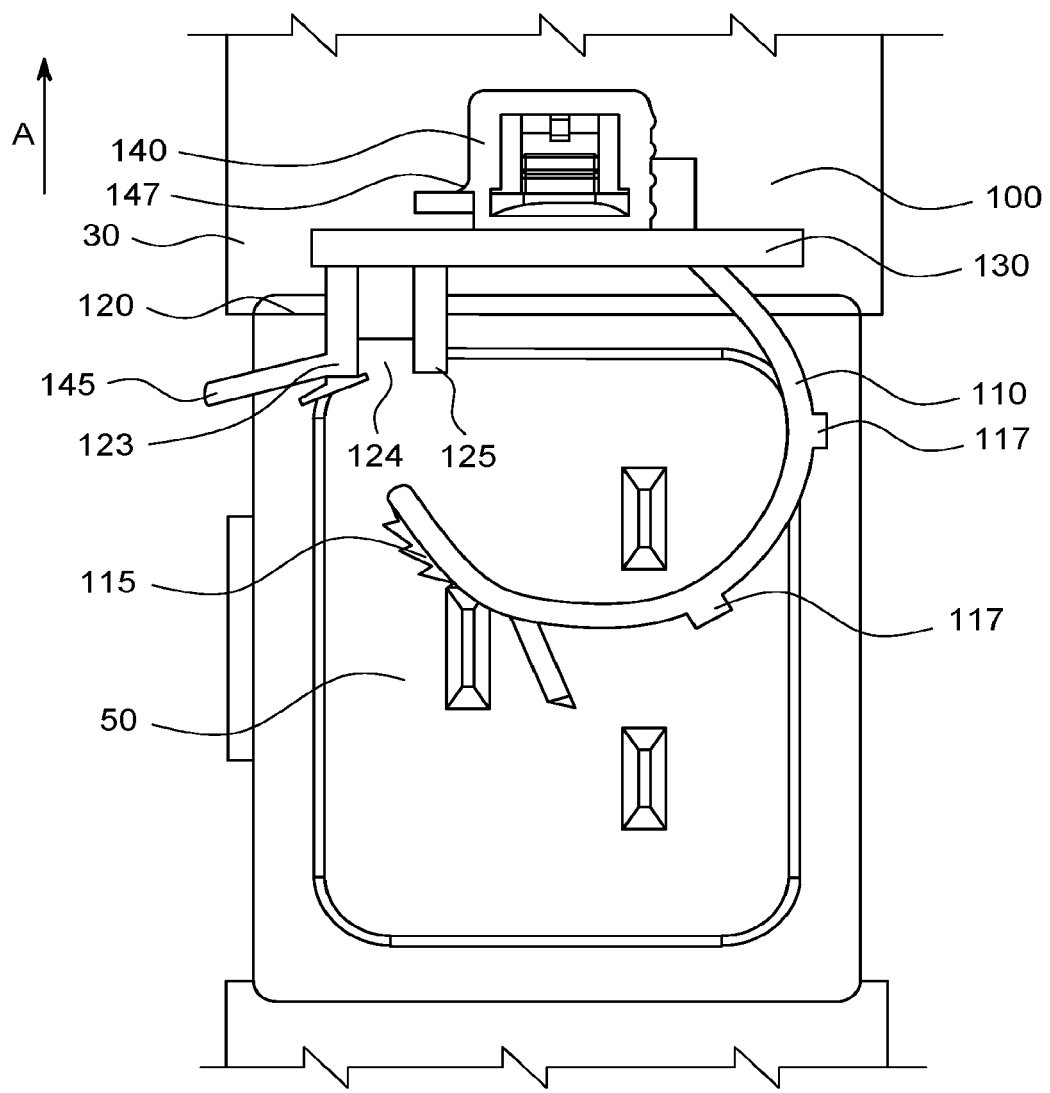
FIG. 1 shows a front view of a retention apparatus for retaining a cord in the prior art.

The present invention is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure provides a retention apparatus for securing a cable into a receptacle of an electronic device. The retention apparatus includes a body with two distal ends. A buckle can be located at one distal end while a housing can be located at the opposite distal end. The buckle can include teeth and at least one stop feature. The housing can include a receiver configured to secure the buckle, a handle portion and a connector. The receiver can include a securing element and guide. The securing element can include at least one notch to connect with the teeth of the buckle. The connector can be configured to secure the retention apparatus to an electronic component. In this way, the location of the receiver within the housing creates a condensed design that fits into the electronic device.

FIG. 1 illustrates a front view of an exemplary retention apparatus 100 for retaining a cord (not shown) in a receptacle 50 in the prior art. The retention apparatus 100 is configured to receive a cable (not shown) to be inserted into a receptacle 50 of an electronic device 30. For the purposes of this application, the electronic device can include a power supply unit. The receptacle 50 can include a three-prong power connector. The retention apparatus 100 includes a buckle 110, a receiver 120, a body 130, and a housing 140. The buckle 110 can include teeth 115 and a stop feature 117. The stop feature 117 ensures that the buckle 110 is not completely inserted into the receiver 120 such that the resulting bending does not cause damage to the buckle 110.

The receiver 120 can include a guide 125 and a securing element 123 configured to secure the buckle 110 within the receiver 120. The distal end of the buckle 110 can be received between the securing element 123 and the guide 125. The guide 125 can be a smooth surface that guides the distal end of the buckle 110. The securing element 123 secures the buckle 110 in place and only allows for the buckle 110 to be inserted but not removed. For example, the securing element 123 can include a notch 124 configured to receive the teeth 115 as the buckle 110 is being inserted into the receiver 120. The notch 124 and the teeth 115 of the buckle 110 can be configured such that the buckle 110 can be inserted into the receiver 120 with little to no effort, while removal of the buckle 110 is prevented without releasing the securing element 123. This ensures a cable (not shown) does not become released from the receptacle 50 of the electronic device 30.

The body 130 of the retention apparatus 100 interconnects the housing 140, the receiver 120 and the buckle 110. The housing 140 can include a connector 147 configured to secure the retention apparatus 100 to the electronic device 30. In an exemplary embodiment, the connector 147 is configured to connect the retention apparatus 100 to the power supply unit. The receiver 120 can include a release lever 145. Specifically, the release lever 145 can be connected to the securing element 123. When no pressure is applied to the release lever 145, it is in its normal state. By applying force to the release lever 145 in direction A, the release lever 145 is actuated. In actuating the release lever 145, the securing element 123 and the notch 124 can be moved away from the guide 125. This movement creates enough space to release the notch 124 from the teeth 115 of the buckle 110; thus, releasing the buckle 110 from the receiver 120. In this way, the power cord (not shown) is released from the retention apparatus 100.

The configuration of the retention apparatus 100 does not lend itself to smaller spaces within a rack server. Specifically, the location of the receiver 120 at a distal end of the body 130 and the housing 140 remote from the receiver 120 creates a wide device that does not fit into the electronic device 30. As shown in FIG. 1, the release lever 145 includes a distal end that abuts or restricts the placement of the retention apparatus within the electronic device 30. The present disclosure provides a novel design that combines one or more features to condense the overall shape of the retention apparatus. The proposed design is more compact; the horizontal direction of space is smaller in comparison to conventional designs.

Figure 2A:
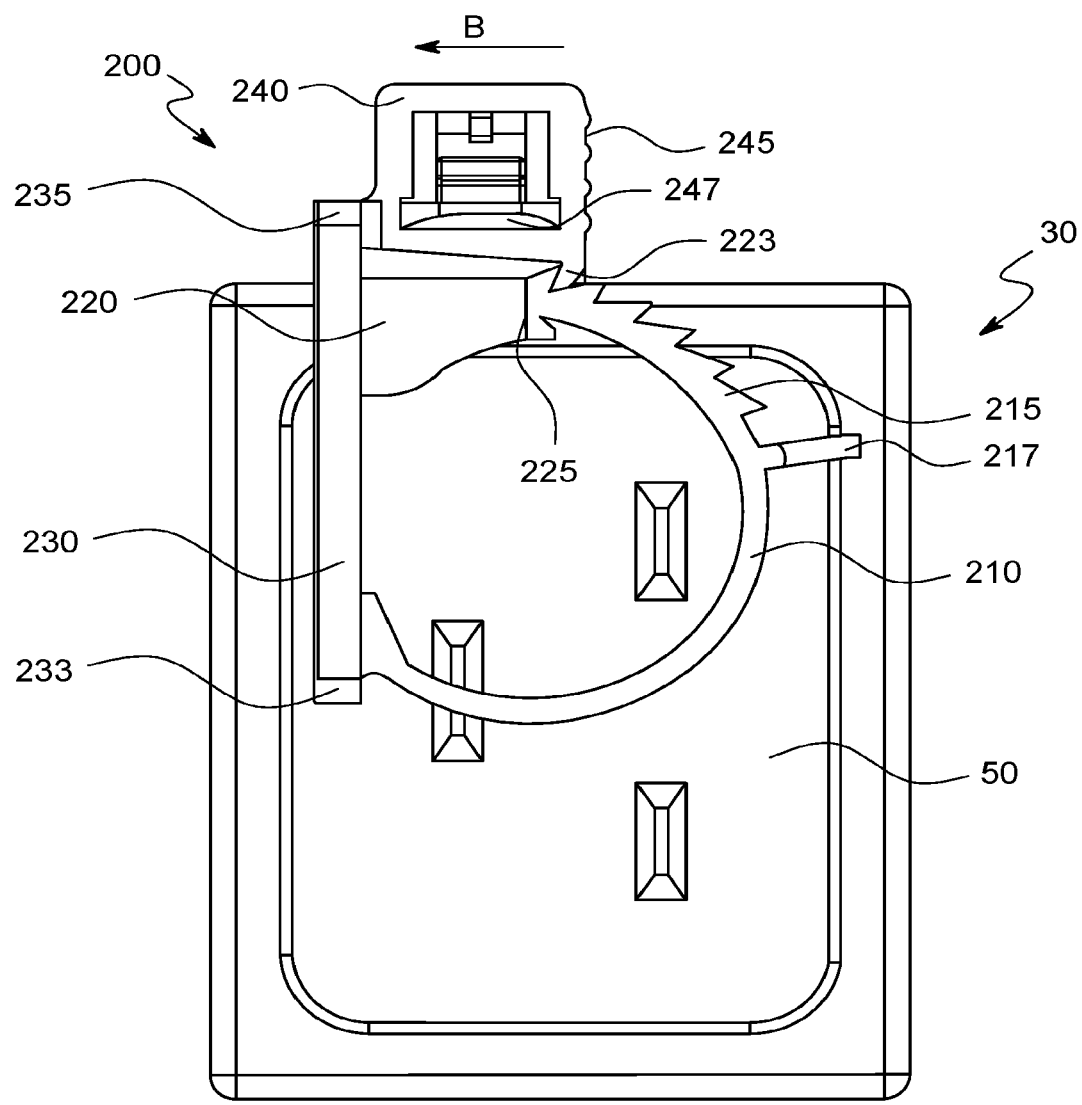
FIG. 2A shows a front view of a retention apparatus for retaining a cord, in accordance with an embodiment in the present disclosure.
Figure 2B:
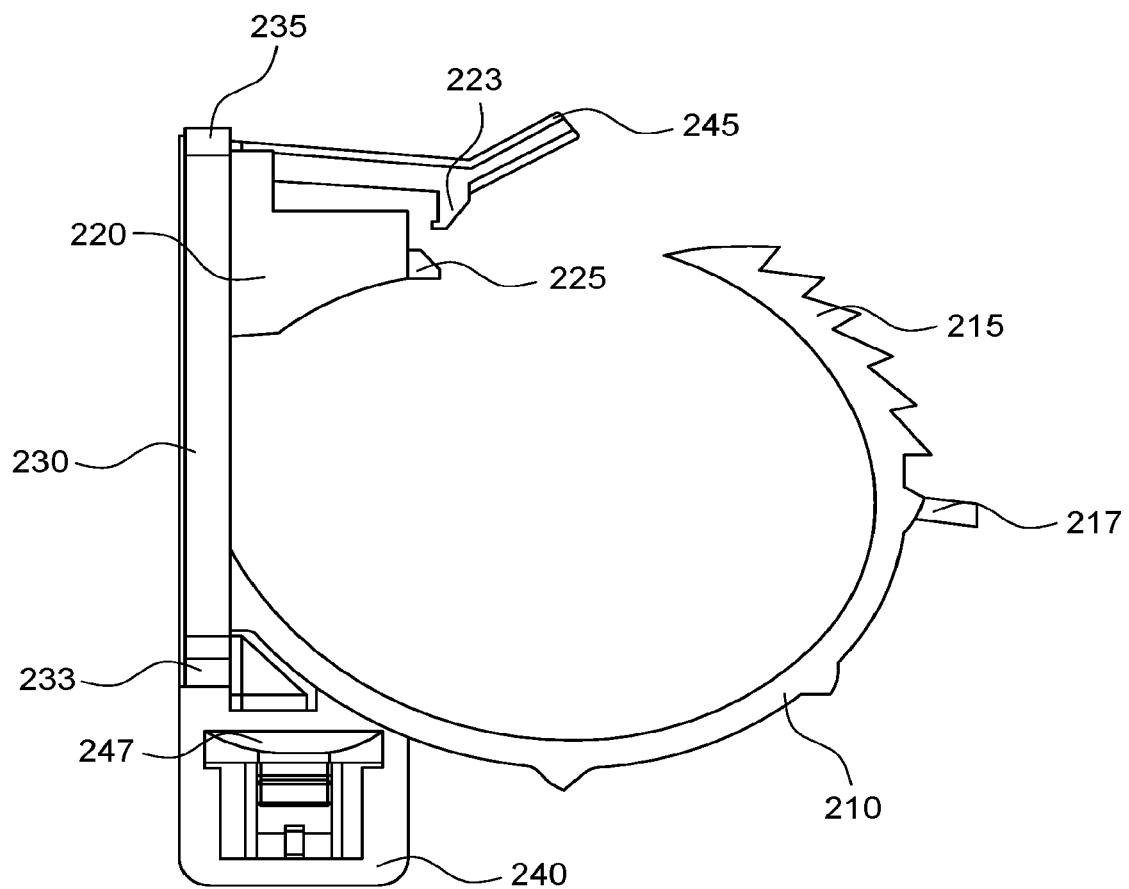
FIG. 2B shows a front view of a second embodiment of the retention apparatus for retaining a cord, in accordance with an embodiment in the present disclosure.

FIG. 2A illustrates a front view of a retention apparatus 200 for retaining a cord (not shown). FIG. 2B illustrates a front view of a second embodiment of the retention apparatus 200 for retaining a cord (not shown). The retention apparatus 200 is configured to receive a cable (not shown) to be inserted into a receptacle 50 of an electronic device 30. For the purposes of this application, the electronic device 30 can include a power supply unit. The receptacle 50 can include a three-prong power connector as shown herein. The retention apparatus 200 includes a body 230 with a first distal end 233 and a second distal end 235. The retention apparatus 200 can also include a buckle 210 and a housing 240. The buckle 210 can be connected to the body 230 at the first distal end 233. The housing 240 can be connected to the body 230 at the opposite second distal end 235. In some embodiments, the housing 240 can be connected to the body at the first distal end 233. This is shown in FIG. 2B. The buckle 210 can include teeth 215 and a stop feature 217. In some embodiments, the buckle 210 can include as little as one tooth 215, or as many as a six teeth 215. The diameter of the wire drives the number of teeth and the length of the buckle 210.

In FIG. 2A, the housing 240 can include a receiver 220, a handle portion 245 and a connector 247. In FIG. 2B, the housing 240 can include a receiver 220 and a connector 247. The handle portion 245 can be located at the second distal end 235. The connector 247 can be configured to secure the retention apparatus 200 to the electronic device 30. Specifically, the connector 247 is configured to connect the retention apparatus 200 to the power supply unit. The connector 247 is discussed in greater detail below with respect to FIGS. 3 and 4. The components listed herein are not intended to be exhaustive.

The receiver 220 can include a guide 225 and a securing element 223 configured to secure the buckle 210 within the receiver 220. A free distal end of the buckle 210 that is not connected to the body 230 can be received between the securing element 223 and the guide 225. The guide 225 can be a smooth surface located within the securing element 223 that guides the distal end of the buckle 210. The guide 225 can be parallel to the underside of the buckle 210 that is opposite of the teeth 215. The securing element 223 includes a tapered side and a flat side opposite the tapered side. As the teeth 215 of the buckle 210 engages the securing element 223, the tapered side allows the buckle 210 to advance within the receiver 220.

The flat side of the securing element 223 acts as a mating piece to the teeth 215 of the buckle 210. This enables the securing element 223 to lock the buckle 210 in place. As a result, without any external forces, the buckle 210 can only be inserted but not removed. This ensures a cable (not shown) does not become released from the receptacle 50 of the electronic device 30. The housing 240 also includes a handle portion 245. The handle portion 245 can assist in releasing the buckle from the receiver 220. The handle portion 245 can be operably engaged and pushed in direction B releasing the buckle 210.

Figure 3:
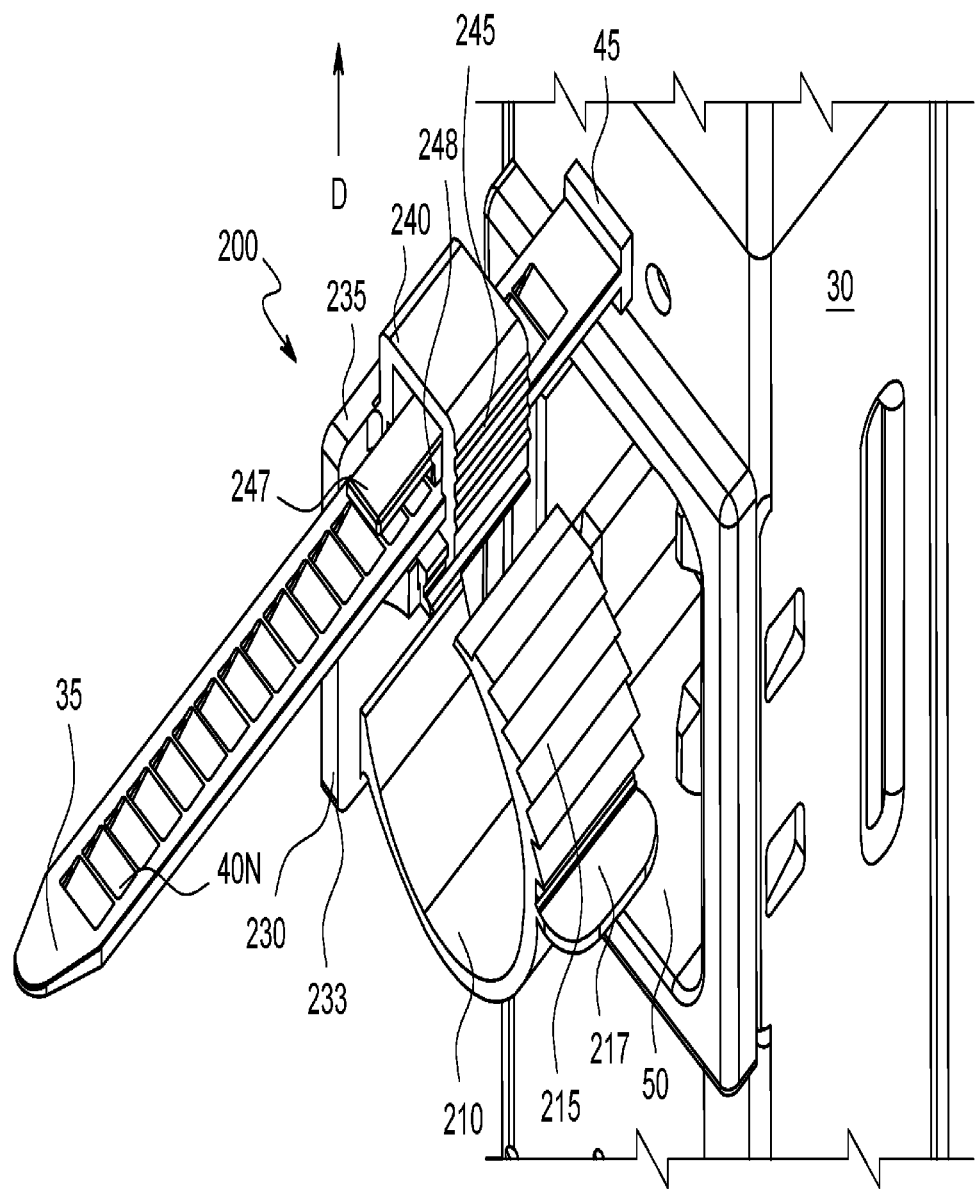
FIG. 3 shows an isometric view of the retention apparatus of FIG. 2 in an open position, in accordance with an embodiment in the present disclosure.

The release lever 245 can be connected to the securing element 223. As shown in FIG. 3, by actuating the release lever 245, the securing element 223 can be moved away from the guide 225. This movement creates enough space to release the securing element 223 from the teeth 215 of the buckle 210; thus, releasing the buckle 210 from the receiver 220. In this way, the power cord (not shown) is released from the retention apparatus 200. The buckle 210 can include a stop feature 217. The stop feature 217 ensures that the buckle 210 is not completely inserted into the receiver 220 such that the resulting bending causes damage to the buckle 210. The stop feature 217 can be located on the buckle 210 to coincide with industry standard power cord diameters.

The configuration of the retention apparatus 200 creates a compressed device that is able to be employed in smaller crevices within a rack server. Specifically, the location of the receiver 220 within the housing 240 creates a more reduced design that fits into the electronic device 30.

Figure 4:
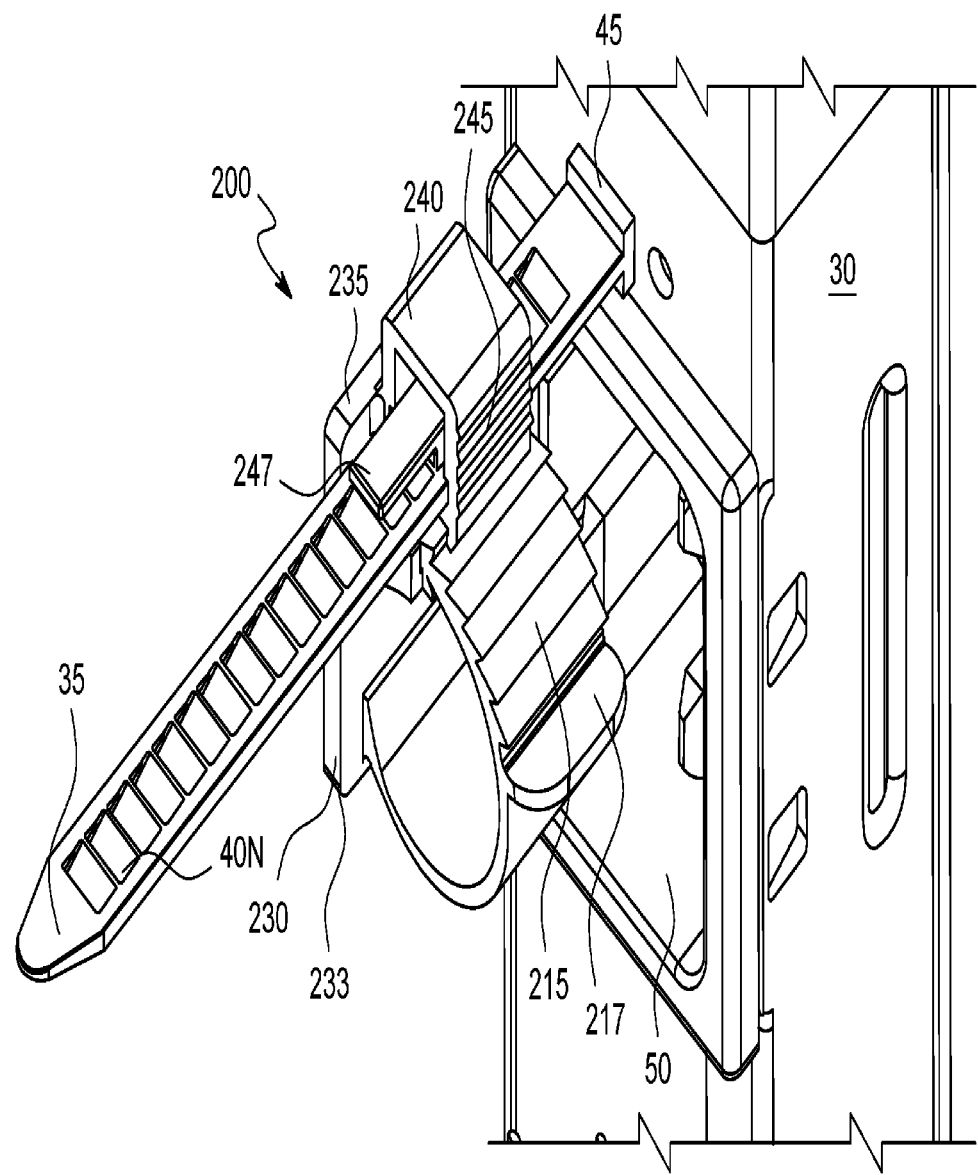
FIG. 4 shows an isometric view of the retention apparatus of FIG. 2 in a closed position, in accordance with an embodiment in the present disclosure.

FIG. 3 illustrates an isometric view of the retention apparatus 200 of FIG. 2 in an open position while FIG. 4 illustrates an isometric view of the retention apparatus 200 of FIG. 2 in a closed position. The electronic device 30 can include a tab 35. The tab 35 can include a plurality of inclined indentations 40N configured to receive the connector 247 of the retention apparatus 200. The tab 35 can be connected to the electronic device at a base 45. The base 45 of the tab 35 can be connected to the electronic device 30 by using an adhesive, screws, nut/bolt combinations, snaps, mated press fittings, other attachment devices, or a combination thereof.

The connector 247 can include a securing element 248 on its underside to correspond with the plurality of inclined indentations 40N. Similar to the securing element 223 of the housing 240, the securing element 248 of the connector 247 can include a tapered side and a flat side opposite the tapered side. As the teeth inclined indentations 40N of the connector 247 engages the securing element 248, the tapered side allows the connector 247 to advance towards the electronic device 30.

The flat side of the securing element 248 acts as a mating piece to the inclined indentations 40N of the tab 35. This enables the securing element 248 to lock the retention apparatus 200 in place along the tab 35. As a result, without any external forces, the retention apparatus 200 can only be inserted but not removed. This ensures the retention apparatus 200 is not removed from the electronic device 30 unintentionally. The connector 247 can assist in releasing the retention apparatus 200 from the tab 35, and subsequently from the electronic device 30. The connector 247 can be operably engaged and pushed in direction D releasing the securing element 248.

Figure 5A:
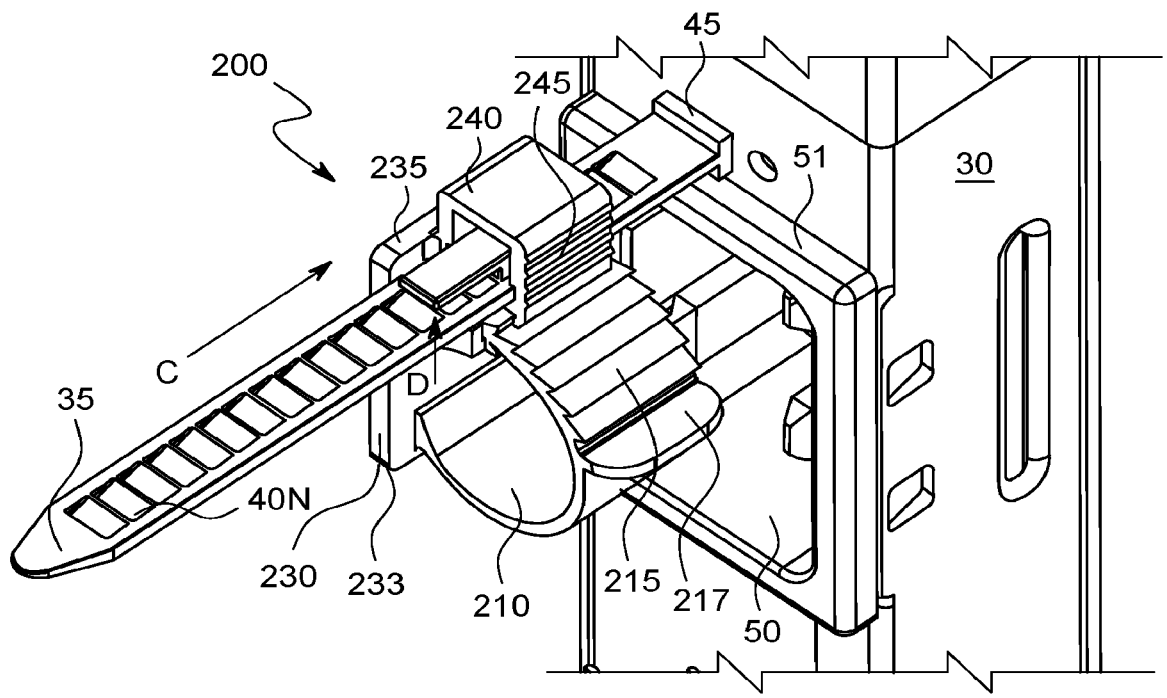
FIG. 5A shows an isometric view of the retention apparatus of FIG. 2 being installed into the electronic device, in accordance with an embodiment in the present disclosure.
Figure 5B:
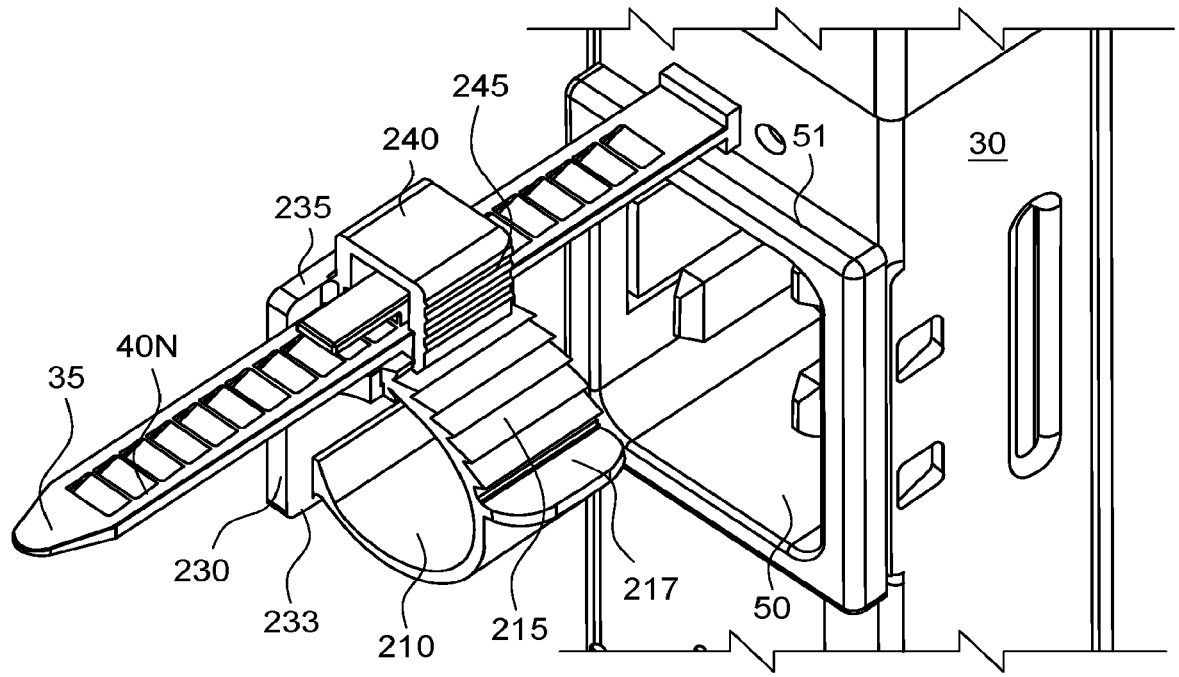
FIG. 5B shows an isometric view of the retention apparatus of FIG. 2 being removed from the electronic device, in accordance with an embodiment in the present disclosure.

FIG. 5A shows an isometric view of the retention apparatus 200 being installed into the electronic device 30. FIG. 5B shows an isometric view of the retention apparatus 200 being removed from the electronic device 30. The connector 247 can be connected to the securing element 248. As shown in FIG. 3, by actuating the connector 247, the securing element 248 can be moved away from the tab 35. This movement creates enough space to release the securing element 248 from the inclined indentations 40N of the tab 35; thus, releasing the retention apparatus 200 from the electronic device 30. The receptacle 50 can include a stop feature 51. The stop feature 51 ensures that the retention apparatus 200 is not inserted flush against the electronic device 30. The stop feature 50 can be located on the electronic device 30 to coincide with industry standard power cord dimensions.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A retention apparatus for securing a power cable to an electronic device, the retention apparatus comprising:
a body comprising a first distal end and a second distal end;
a buckle connected to the retention apparatus at the first distal end of the body, wherein a free end of the buckle comprises at least one tooth;
a receiver configured to secure the free end of the buckle, the receiver being mounted at the first distal end;
a housing located at the second distal end of the body;
a handle portion connected to the receiver and configured to release the free end of the buckle; and,
a tab, the tab comprising a first end connected to the electronic device and a distal end remote from the electronic device, the tab further comprising a plurality of inclined indentations between the first end and the distal end; wherein the housing is moveably connected to said tab so as to be moveable towards or away from the electronic device.

2. The retention apparatus of claim 1, wherein the buckle further comprises a stop feature configured to restrain the buckle from becoming completely inserted into the receiver such that a resulting bending does not cause damage to the buckle.

3. The retention apparatus of claim 1, wherein the securing element comprises at least one notch configured to receive the at least one tooth as the buckle is being inserted into the receiver.

4. The retention apparatus of claim 1, wherein the receiver comprises a guide comprising a smooth surface that guides the free end of the buckle into the receiver.

5. The retention apparatus of claim 4, wherein the interconnection of the handle portion to the receiver is configured to position the securing element away from the guide to release the at least one tooth of the buckle from the receiver.

6. The retention apparatus of claim 1, further comprising a connector configured to engage at least one of the plurality of inclined indentations to connect or release the retention apparatus the electronic component.

7. A system comprising:
an electronic device comprising a receptacle;
a cord configured to connect to the electronic device via the receptacle; and
a retention apparatus for securing the cord, the retention apparatus comprising:
a body comprising a first distal end and a second distal end;

a buckle connected to the retention apparatus at the first distal end of the body, wherein a free end of the buckle comprises at least one tooth;

a receiver configured to secure the free end of the buckle via the at least one tooth, the receiver being mounted at the first distal end;

a housing located at the first distal end or the second distal end of the body;

a handle portion interconnected to the receiver and configured to release the free end of the buckle; and, a tab, the tab comprising a first end connected to the electronic device and a distal end remote from the electronic device, the tab further comprising a plurality of inclined indentations between the first end and the distal end; wherein the housing is moveable connected to said tab so as to be moveable towards or away from the electronic device.

8. The system of claim 7, wherein the buckle further comprises a stop feature configured to restrain the buckle from becoming completely inserted into the receiver such that a resulting bending does not cause damage to the buckle.

9. The system of claim 7, wherein the securing element comprises at least one notch configured to receive the at least one tooth as the buckle is being inserted into the receiver.

10. The system of claim 7, wherein the receiver comprises a guide comprising a smooth surface that guides the free end of the buckle into the receiver.

11. The system of claim 10, wherein the interconnection of the handle portion to the receiver is configured to position the securing element away from the guide to release the at least one tooth of the buckle from the receiver.

12. The system of claim 7, wherein the retention apparatus further comprises a connector configured to engage at least one of the plurality of inclined indentations to connect or release the retention apparatus to the electronic device.

13. The system of claim 7, wherein the receptacle comprises a three-prong power connector.

14. The system of claim 7, wherein the electronic device comprises a power supply unit.

* * * * *